US009596183B2

(12) United States Patent
Batra

(10) Patent No.: US 9,596,183 B2
(45) Date of Patent: Mar. 14, 2017

(54) NAS OFF-LOADING OF NETWORK TRAFFIC FOR SHARED FILES

(71) Applicant: Western Digital Technologies, Inc., Irvine, CA (US)

(72) Inventor: Rajesh K. Batra, Los Altos, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 29 days.

(21) Appl. No.: 14/569,075

(22) Filed: Dec. 12, 2014

(65) Prior Publication Data
US 2016/0173381 A1   Jun. 16, 2016

(51) Int. Cl.
G06F 15/167   (2006.01)
H04L 12/803   (2013.01)
H04L 29/08   (2006.01)
G06F 3/06   (2006.01)

(52) U.S. Cl.
CPC ............ H04L 47/122 (2013.01); G06F 3/06 (2013.01); H04L 67/06 (2013.01); H04L 67/1097 (2013.01)

(58) Field of Classification Search
None
See application file for complete search history.

(56) References Cited

U.S. PATENT DOCUMENTS 6,141,759 A * 10/2000 Braddy ................ G06F 9/5044 709/203
6,407,680 B1   6/2002 Lai et al.
6,499,054 B1   12/2002 Hesselink et al.
6,732,158 B1   5/2004 Hesselink et al.
7,120,692 B2   10/2006 Hesselink et al.
7,454,443 B2   11/2008 Ram et al.
7,467,187 B2   12/2008 Hesselink et al.
7,546,353 B2   6/2009 Hesselink et al.
7,587,467 B2   9/2009 Hesselink et al.
7,600,036 B2   10/2009 Hesselink et al.
7,788,404 B2   8/2010 Hesselink et al.
7,917,628 B2   3/2011 Hesselink et al.
7,934,251 B2   4/2011 Hesselink et al.
7,949,564 B1   5/2011 Hughes et al.
8,004,791 B2   8/2011 Szeremeta et al.

(Continued)

OTHER PUBLICATIONS

International Search Report and Written Opinion dated Apr. 1, 2016 in related International Application PCT/US2015/064900.

Primary Examiner — Joshua Joo
(74) Attorney, Agent, or Firm — Young Law Firm, P.C.

(57) ABSTRACT

A device may comprise storage, a network interface configured to couple the device to a computer network and a processor connected to the storage and to the network interface. The processor may be configured to store a file in the storage, divide the file into at least a first and second part, send the first part of the file to a first selected remote storage coupled to the computer network and send the second part of the file to a second selected remote storage coupled to the computer network, the second remote storage being different from the first remote storage, such that, responsive to receiving, over the network, a request from a requestor to access the file, the first part of the file is provided to the requestor from the first remote storage and the second part of the file is provided to the requestor from the second remote storage.

18 Claims, 3 Drawing Sheets

(56) References Cited

U.S. PATENT DOCUMENTS

| | | |
|---|---|---|
| 8,095,116 B2 | 1/2012 | Hundscheidt et al. |
| 8,220,027 B1 | 7/2012 | Dagman et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,825,591 B1* | 9/2014 | Lai .................... G06F 17/30073 707/602 |
| 9,137,304 B2* | 9/2015 | Novotny ............. H04L 67/1097 |
| 2002/0049760 A1* | 4/2002 | Scott ................. G06F 17/30067 |
| 2003/0120723 A1* | 6/2003 | Bright ................... G06F 3/0601 709/203 |
| 2003/0233455 A1* | 12/2003 | Leber .................... G02F 1/1339 709/226 |
| 2004/0117455 A1* | 6/2004 | Kaminsky ............... H04L 67/42 709/214 |
| 2005/0144195 A1 | 6/2005 | Hesselink et al. |
| 2005/0144200 A1 | 6/2005 | Hesselink et al. |
| 2006/0112188 A1 | 5/2006 | Albanese et al. |
| 2009/0063507 A1* | 3/2009 | Thompson ........ G06F 17/30206 |
| 2010/0088335 A1* | 4/2010 | Mimatsu ................. H04L 67/06 707/770 |
| 2010/0094931 A1 | 4/2010 | Hosur et al. |
| 2010/0191825 A1* | 7/2010 | Yamagishi ............ H04L 67/108 709/217 |
| 2012/0036041 A1 | 2/2012 | Hesselink |
| 2012/0042162 A1* | 2/2012 | Anglin .................... G06F 21/57 713/165 |
| 2012/0239892 A1* | 9/2012 | Peters ................. G06F 11/1076 711/162 |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0108617 A1* | 4/2014 | Gerstner ............. G06F 12/1408 709/219 |
| 2014/0169921 A1 | 6/2014 | Carey |
| 2014/0173215 A1 | 6/2014 | Lin et al. |
| 2014/0280010 A1 | 9/2014 | Ravipati et al. |
| 2014/0280906 A1* | 9/2014 | Johns ...................... H04L 45/28 709/224 |
| 2014/0282938 A1* | 9/2014 | Moisa ...................... G06F 3/06 726/6 |
| 2015/0237109 A1* | 8/2015 | Ferdowsi ................ H04L 67/42 709/203 |
| 2016/0014203 A1* | 1/2016 | Myrah .................. G06F 3/0617 709/214 |

* cited by examiner

NAS OFF-LOADING OF NETWORK TRAFFIC FOR SHARED FILES

BACKGROUND

Network-attached storage (NAS) is the common name for a category of file-level computer data storage that is configured to be connected to a computer network and to provide data access to a heterogeneous group of clients. A NAS not only operates as a file server, but is specialized for this task either by its hardware, software, or configuration of those elements. NAS devices are often manufactured as specialized computers built from the ground up for storing and serving files.

NAS devices are networked appliances which contain one or more hard drives, often arranged into logical, redundant storage containers or RAID. Network-attached storage removes the responsibility of file serving from other servers on the network. Of late, NAS devices have emerged as a popular and convenient way to share files among multiple computers. Compared to file servers, NAS device offer faster data access, easier administration, and simple configuration. They typically provide access to files using network file sharing protocols such as NFS, SMB/CIFS, or AFP.

DETAILED DESCRIPTION

NAS owners often want to share their movies and pictures and other content with others. However, they do not want the available bandwidth of their home network to be unacceptably reduced by share recipients downloading movies or other rich media directly from their NAS, lest other devices on the home network not have needed bandwidth to function properly. Moreover, users do not care how the sharing of their files is carried out. Users only want to designate those with whom they wish to share and the content to be shared, leaving the underlying mechanics of the sharing to the NAS device.

Embodiments are related to the storage and sharing of files over computer networks. Once a user decides to share a large file with designated share recipients, one embodiment uploads the file or constituent portions thereof, over a computer network (including, for example, the Internet), to one or more remote storage (such as, for example, cloud storage services). Embodiments, however, are not limited to so-called "cloud" remote storages and may make effective use of most any remote storage such as, for example, a remotely-located NAS to which the user has access rights, whether belonging to the user or not. This off-loads at least some network traffic from the LAN where the NAS resides to a WAN (e.g., cloud storage services, other NASs or most any other remote storage device, service or facility). The share recipients may then be provided with one or more links from which to obtain the file or the constituent portions thereof.

Figure 1:
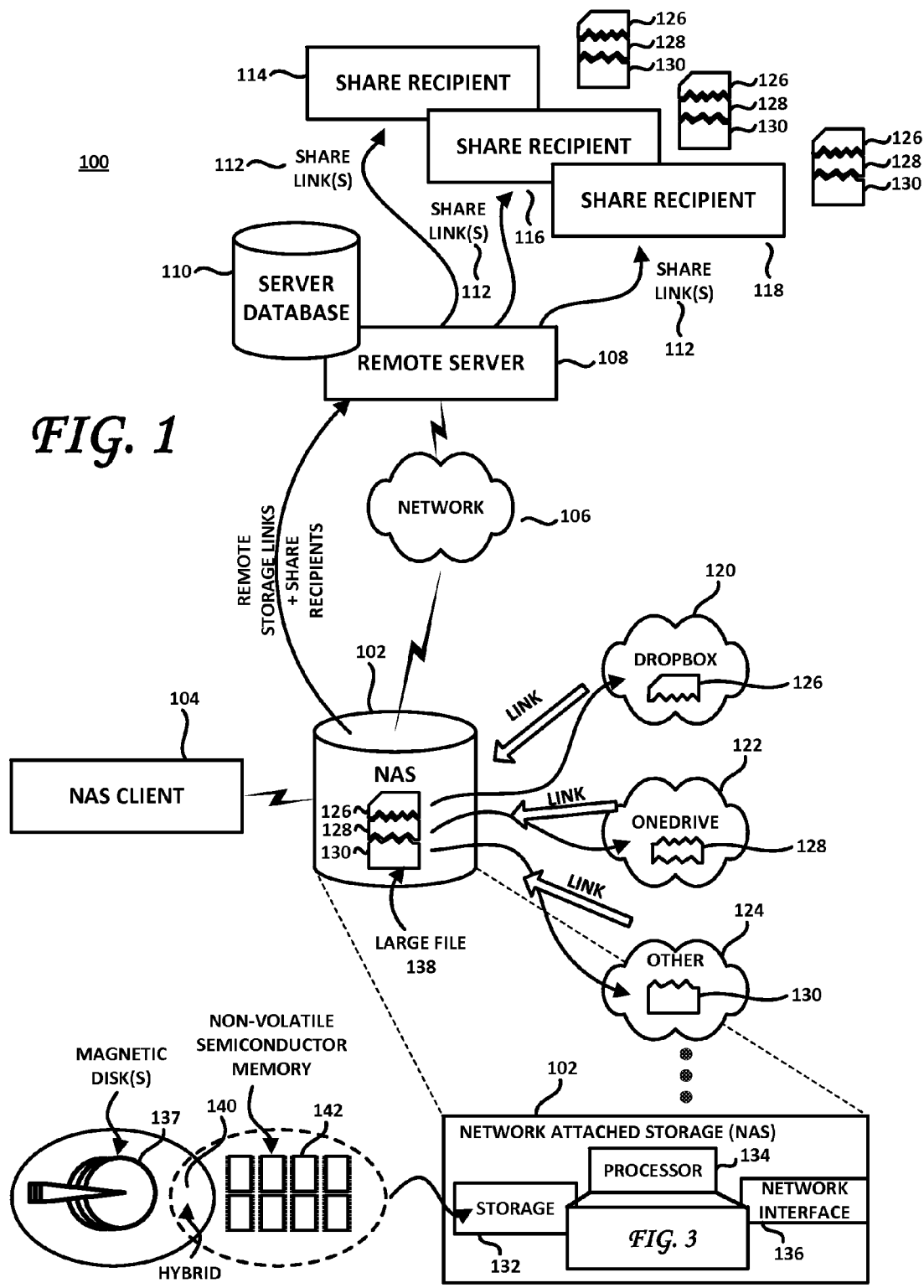
FIG. 1 is a block diagram of a device and a system, illustrating aspects of one embodiment.

FIG. 1 is a block diagram of a system 100 comprising a device 102 according to one embodiment. In one embodiment, the device 102 may be or comprise a NAS. The device 102, whether configured as a NAS or differently, may comprise storage 132. The storage 132 may comprise one or more hard disk drives (HDDs) each comprising one or more spinning magnetic disks. The storage 132 may alternatively comprise non-volatile (e.g., Flash-based) memories 142. Alternatively still, the storage 132 may comprise one or more hybrid storage devices, each comprising both magnetic disks 137 and non-volatile semiconductor memory 142. The device 102 may also comprise one or more network interfaces, enabling the device 102 to communicate with the network 106 and/or other external devices through communication ports. As also shown in FIG. 1, the device 102 may also comprise a processor 134 coupled to both the storage and to the network interface 136. The processor may be configured to execute instructions configured to implement the functionality described and shown herein.

According to one embodiment, the NAS 102 may store a (e.g., large) file 138 in storage 102. The file 138 may be or comprise, for example, audio content, video content, textual content or mixed content. The NAS client may wish to share the file 138 with one or more share recipients, shown at 114, 116 and 118 in FIG. 1. The sharing may be at the initiative of the user of the NAS client 104 or at the request of one or more the share recipients 114, 116, 118. Rather than streaming the file 138 directly to each of the intended share recipients 114, 116, 118 or making the same available for streaming or download by the share recipients 114, 116, 118 from the device 102, one embodiment leverages the availability of reliable, inexpensive online remote storage to good effect. Indeed, in one embodiment, the processor(s) 134 of the device 102 may cause the file 138 and/or parts thereof to be sent to one or more of the online remote storages 120, 122 and/or 124, from which the file 138 may be sourced to the intended share recipients 114, 116 and 118.

According to one embodiment, one or more of the online remote storages 120, 122, 124 may be configured as a file hosting service that allows users to upload and sync files to a cloud storage and then access them from, for example, a Web browser of their local device. The file may also be accessed from, for example, an app on a mobile device. Examples of such online remote storages as of this writing include Dropbox, Microsoft OneDrive and SpiderOak, to name but a few. According to one embodiment, the processor 134 may be configured to send the entire file 138 to one or more online remote storages 120, 122, 124, which may then make the file available to share recipients directly or via remote server 108. For example, the remote online storages 120, 122, 124 may be requested to send all or different parts of the file to the remote server 108, who may then re-assemble the file 138 and stream the file directly to share recipients 114, 116, 118 or make the same available for download by the share recipients 114, 116, 118.

Alternatively and according to one embodiment, the file 138 may be divided by the processor 134 (or caused to be so divided by the processor 134) into two or more constituent parts of portions. In the implementation shown in FIG. 1, the file 138 is divided into three portions 126, 128, 130 which may or may not be of the approximate same size. One or more of these constituent parts may be sent to one or more of the online remote storages 120, 122, 124 for storage therein. As shown in FIG. 1, file part 126 has been caused to be stored in online remote storage 120, file part 128 has been caused to be stored in online remote storage 122 and file part 130 has been caused to be stored in online remote storage 124. Had the file been divided into a greater number of parts, such parts may be (but need not) stored in additional online remote storages. Each of the online remote storages may receive a different file part 126, 128, 130. Alternatively, each of the online remote storages may receive more than one of the file parts 126, 128, 130. Each of the online remote storages may, according to one embodiment, receive each of the file parts 126, 128, 130.

As shown in FIG. 1, the device 102 may be further coupled, via a computer network 106, to a remote server 108. A database 110 may be coupled to (remotely or locally) to the remote server 108 and may be configured to store one or more entries that identify at least the online remote storages 120, 122 and/or 124 that store the file 138 and/or one or more constituent parts thereof. The entry or entries in the server database 110 may also store the location (in the form of a link, for example) of the file or part(s) thereof in each of the remote online storages 120, 122, 124.

According to one embodiment, when a user selects a large file 138 to be shared with identified share recipients 114, 116, 118, the device 102 (a NAS in one embodiment) may send the entire file 138 to one cloud storage service or break up the file into two or more pieces and send each piece to a separate cloud storage service (with which the user has an account, for example). The cloud storage (e.g., Dropbox, Google Write, OneDrive, etc.) receives the file 138 or the portion 126, 128 and/or 130 thereof assigned to that cloud service and returns a link to the file or piece thereof to the device 102. The device 102 may then send this received link or links to a remote server 108, together with a list of intended recipients.

The remote server 108 may then notify the share recipients 114, 116, 118 and provide them with a link 112 with which to retrieve the large file 138 to be shared. The remote server 108 may then coordinate the downloading of the large file 138 from the cloud storages 120, 124, 126 by each share recipient 114, 116, 118. That is, the remote server 108 may provide each share recipient 114, 116, 118 with the appropriate link(s) 112 to enable each of the share recipients to access the cloud storage 120, 122, 124 where the large file 138 or piece 125, 128, 130 thereof is stored and to stream or download that large file or piece thereof. Multiple pieces of the file may be downloaded by the share recipient at the same time.

Indeed, according to one embodiment, when a request is received to share the file 138, the remote server 108 may access the server database 110 and provide one or more links 112 to either the requestor for forwarding to the share recipients 114, 116, 118 (the requestor and the share recipients may be one and the same). The remote server 108 may then send the link(s) to the share recipients 114, 116, 118 to enable them to either download (i.e., store a local copy) or stream the file 138. In so doing, the remote server 108 may coordinate the retrieval of the file 138 and/or constituent parts thereof 126, 128, 130 from the online remote storages 120, 122, 124 and stitch the file 138 back together and provide the stitched file 138 to the share recipients 114, 116, 118. Alternatively, the remote server 108 may coordinate the retrieval of the file 138 and/or constituent parts thereof 126, 128, 130 from the online remote storages 120, 122, 124 and provide them (sequentially, for example) to the share recipients 114, 116, 118, who may themselves accumulate and stitch the file 138 back together for rendering and/or local storage.

According to one embodiment, the server database 110 does not store the file 138 or constituent parts thereof. Instead, the server database 110 may be configured to store the location(s) of the file 138 or parts thereof across the online remote storages. These locations may change and the database 138 may be configured to update the location(s) of the file 138 or parts thereof across the online remote storages. For example, such locations may change when the file 138 or parts thereof are move closer to share recipients, or for any other reason. The location(s) of the file 138 and/or parts thereof may be updated according to business rules, due to unavailability of one or more remote storages. Thus, the links to the file 138 and/or parts thereof may be dynamic and may be dynamically updated. The device 102 may receive a share request from any of the share recipients 114, 116 118 and/or from a user of a mail program (for example) coupled to the NAS client 104. The device 102 may, therefore, communicate the identity and location (such as and Internet Protocol (IP) address or email addresses, for example) of the share recipients and/or any permissions necessary to access the shared content. According to one embodiment, the device 102 may itself be configured to discharge the functionalities provided by the remote server 108 and/or the database server 110. That is, instead of receiving links from each of the online remote storages and provide such to the remote server 108 for storage in the server database 110, the device 102 may receive the links from the online remote storages 120, 122, 124 and store them in an internal database. This enables the device 102 to later provide the stored links to selected share recipients and/or retrieve the content pointed to by the stored links and stream the content to the selected share recipients and/or make the content available for download by the share recipients over the computer network 106.

FIG. 1 also shows representative structure of a device 102, such as a NAS configured according to one embodiment. As noted herein, a network attached storage or NAS, within the present context, may comprise any device that is configured to store and serve data and that is configured to couple to a LAN. Such NAS 102, according to one embodiment, may comprise a storage device 132 that may be configured to store data on one or more rotating magnetic disks 138, on one or more non-volatile semiconductor memory devices 142 or on both magnetic disk(s) 137 and non-volatile semiconductor memory devices 142, as suggested at reference numeral 140. The NAS 102 may also comprise a network interface 136 such as, for example, a Universal Serial Bus (USB) interface, an Ethernet interface, Firewire interface and/or some other wired or wireless network interface. The NAS 102, as shown in FIG. 1, may also comprise one or more single or multi-core processors 134 configured to read from and write to the storage device 132 and to execute a method comprising a sequence of functional blocks, instructions or steps, such as described herein.

Figure 2:
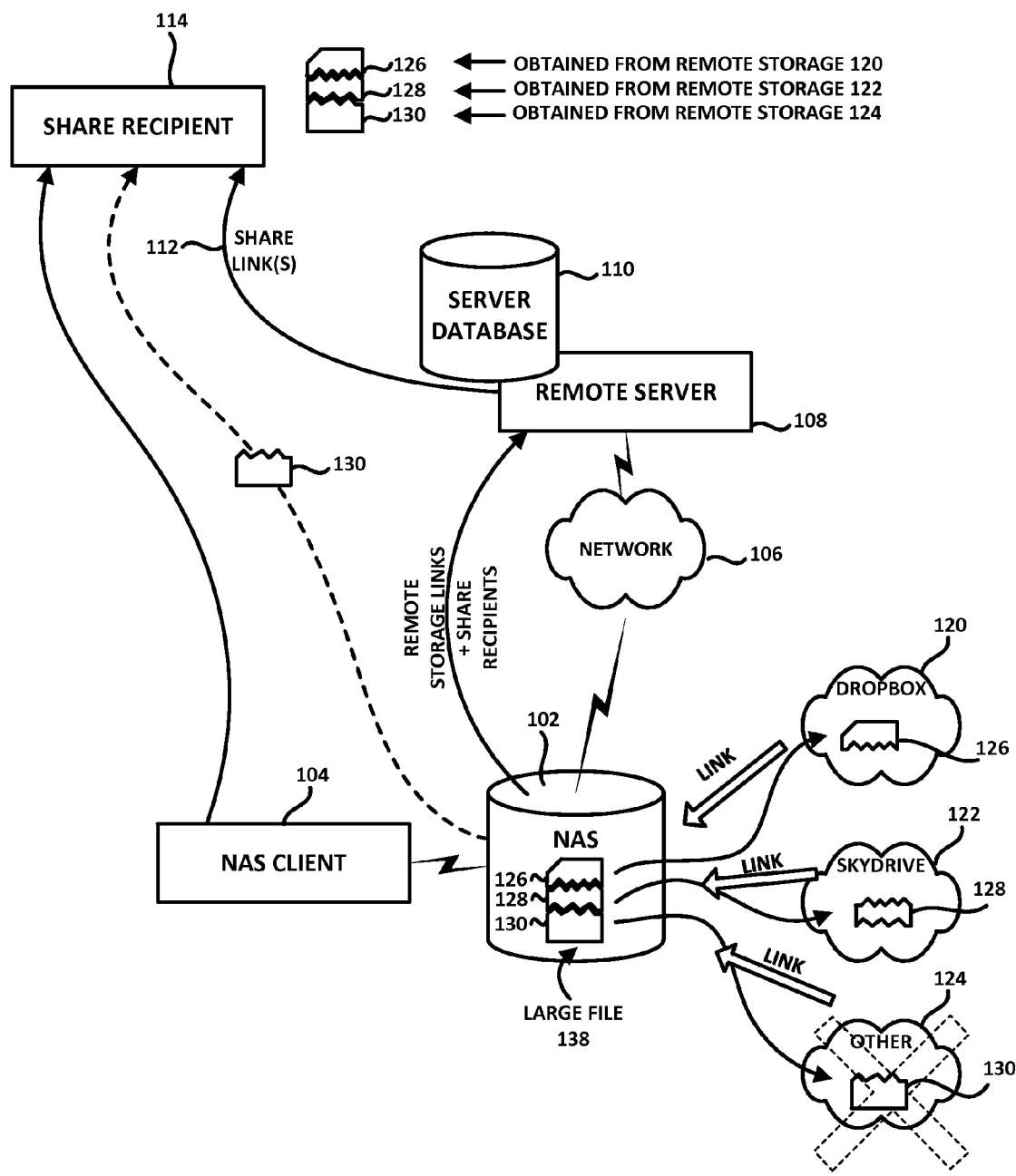
FIG. 2 is a block diagram of a device and a system, illustrating aspects of one embodiment.

FIG. 2 is a block diagram of a device and a system, illustrating aspects of one embodiment. FIG. 2 shows one embodiment in which the remote server 108 provides the share link or links 112 to a share recipient 114, whereupon the share recipient streams the file 138 directly from the remote storage(s) 120, 122, 124 referenced by the link(s) 112. In the scenario shown in FIG. 2, the remote storage service 124 is non-operational or unreachable. However, remote storage 124 is that remote storage that stores one of the constituent parts 130 of the file 138 to be made available to the share recipient 114. However, according to one embodiment, the device 102 (a NAS, in one embodiment), when causing copies of constituent parts 126, 128, 130 to be stored in remote storages 120, 122, 124, does not rid itself of the file 138 and/or of the constituent parts 126, 128, 130 thereof. Indeed, the device 102, according to one embodiment, still maintains a local copy of the file 138 and the constituent parts 126, 128, 130 thereof. This enables the device 102 to provide the part 130 of the file 138, either directly to the share recipient 114 or to the remote server 108 for forwarding to the share recipient 114, in the event that this part 130 is unavailable or inaccessible from the remote storage 124. The remote server 108 may then forward the part 130 to the share recipient 114. Alternatively, rather than sending the constituent part 130 of the file 138 to the share recipient 114, a link pointing to the location of the part 130 of the file (either in the remote server 108 or in the device may be sent to the share recipient 114, together with any permissions that may be necessary to access the file or parts thereof. The link may be sent from the device 102 directly or may be forwarded from the device 102 to the remote server 108 and from the remote server 108 to the share recipient 114.

For example, one or more links may be sent over the computer network to the requestor. The one or more links, according got one embodiment, may provide access, to the requestor, to one or more parts of the requested file, which parts may be stored in one or more remote storages that are accessible over the network 106. For example, a link to a Microsoft VISIO file from Microsoft OneDrive may take a form similar to https://identifier-my.sharepoint.com/personal/email_address_com/Documents/dir/subdir%20(T7506%20NAS%20Off-Loading%20of%20Net%20Traffic)/filename.vsd According to one embodiment, the file 138 and/or the constituent parts thereof, may be encrypted. The encryption may be the same across parts 126, 128, 130 of the requested file 138 or the encryption may be dissimilar across remote storage devices or services 120, 122, 124. The file 138 and/or constituent parts thereof may be decrypted where they are stored before being sent in the clear across network 106. Alternatively, the decryption may occur at the device 102 or the remote server 108. Decryption can also, according to one embodiment, occur at the share recipient 114, provided that suitable decryption keys are provided thereto.

According to one embodiment, the device 102 may be configured to track the number of times a stored file has been accessed over the computer network. The device 102 may be configured to divide the file and send parts thereof to one or more remote storages such as shown at 120, 122, 124 when the number of times the stored filed has been accessed over the computer network exceeds an access threshold (say, three times). The decision as to where to send the parts 126, 128, 130 of the file 138 may be predetermined or determined on the fly, based upon, for example, characteristics of the file and/or characteristics or status of the plurality of remote storages. The parameters affecting this decision may include the cost of the cloud storage 120, 122, 124, the space available, the size of the file to be shared, among other possibilities. According to one embodiment, multiple devices 102 (e.g., NASs (if present)) may coordinate to achieve this result, each uploading a portion 126, 128, 130 of the large file 138 to a predetermined remote storage (e.g., cloud storage service or services).

In one embodiment, once uploading the file to be shared is completed, the available bandwidth of the device 102 is only sparingly used while sharing. Thereafter, the device 102 can leverage the bandwidth of the remote storages 120, 122, 124. Moreover, the act of sharing a file or files is relatively undemanding of the user's attention: the user designates the file 138 to be shared and the share recipients 114, 116, 118 and need not be further involved. Indeed, embodiments make the sharing of large files with multiple recipients practical and the mechanics thereof largely transparent to the user.

Figure 3:
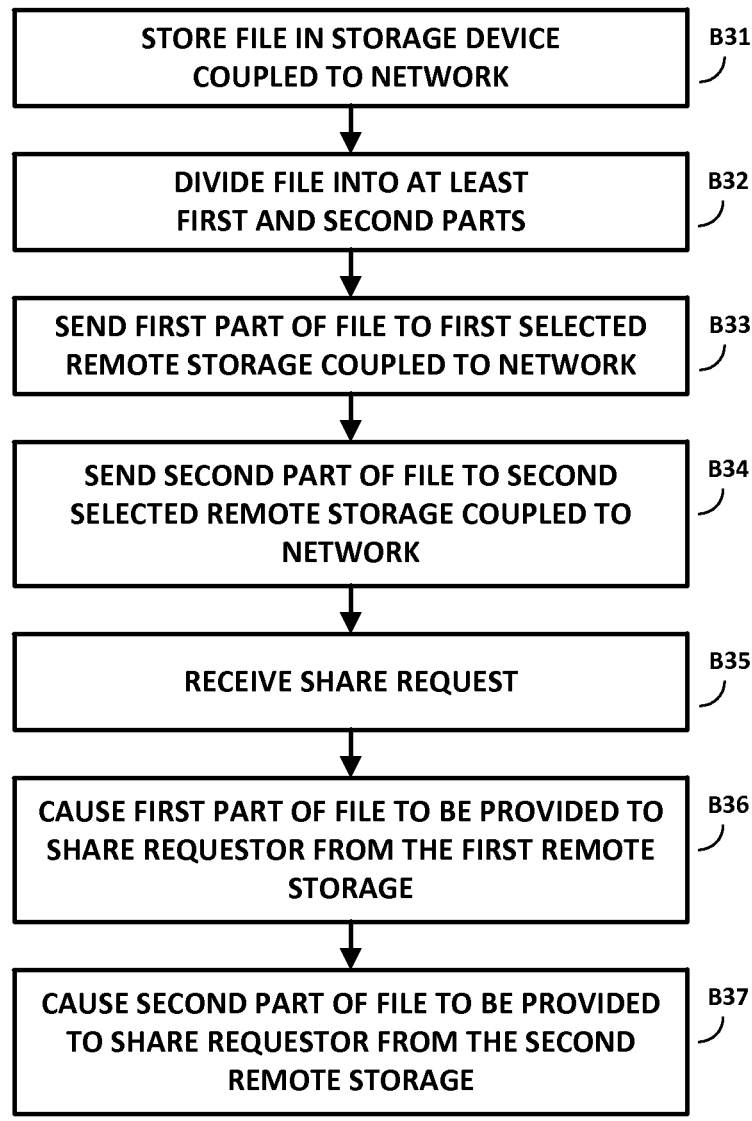
FIG. 3 is a flowchart of a computer-implemented method of sharing a file, according to one embodiment.

FIG. 3 is a flowchart of a method of sharing files, according to one embodiment. As shown therein, block B31 calls for storing a file in a storage device coupled to a computer network. The storage device may include, for example, a user's NAS 102. The file, as shown at B32, may then be divided into at least a first part and a second part. The number of parts into which the file is divided may depend on, for example, the size of the file, sensitivity to latency, the number and nature of the available remote storages, the available network bandwidth at the NAS, among other possibilities. At block B33, the first part of the file may be send to a first selected remote storage coupled to the computer network and a B34, the second part of the file to a second selected remote storage coupled to the computer network, the second remote storage being different from the first remote storage. It is to be understood that were the file in question divided into a greater number of file parts, such parts would then be sent to respective other remote storages, as available. Alternatively, more than one file part may be sent to the first remote storage and more than one file part may be sent to the second remote storage. As shown at B35, responsive to receiving, over the computer network, a share request from a requestor to access the file, the first part of the file may be provided to and received by the requestor from the first remote storage and the second part of the file may be provided to and received by the requestor from the second remote storage. It is to be understood that, if the file was divided into a greater number of parts, such parts may also be correspondingly provided to and received by the requestor.

According to one embodiment, the requestor may be the person or entity that originally stored the file in the NAS or may be some other person or entity that has or has secured access rights to the file from the owner thereof. Such access rights may include the full panoply of rights with which a remotely-stored file may be associated. For example, the requestor may have read only rights, full read/write authority, may be limited to streaming only, and the like.

According to one embodiment, the method of FIG. 3 may further comprise updating a database with one or more entries that identify the first selected remote storage and the second selected remote storage. The database may be remote from the NAS as shown at 110 in FIGS. 2 and 3 or may within or locally-accessible to the NAS 102. The database may be distributed across several physical locations. According to one embodiment, a first link may be received from the first storage location, the first link pointing to the location of the first part of the file in the first selected remote storage. A second link may be received from the second remote storage, the second link pointing to the location of the second part of the file in the second selected remote storage. Further links pointing to additional remote storage locations (or the same remote storage locations) may be received if the file was divided into a greater number of constituent parts. These links may then be sent, over the computer network, to the requestor(s), such as share recipient or recipients 114, 116 and/or 118, to enable the requestors to request and access the respective file parts.

Alternatively, the link(s) sent over the network 106 may be sent to a server such as shown at 108. The server, according to one embodiment may be configured to retrieve the first and second parts of the file from the first and second remote storages and to send the retrieved first and second parts to the requestor(s). The structure and functionality of the remote server 108 may, according to one embodiment, be incorporated into the NAS 102 or even the NAS client 104. According to one embodiment, the first remote storage and/or the second remote storage may comprise a file hosting service. However, the first and second remote storages may be any network-accessible storage device, service or system. The file and the constituent parts thereof into which the file is divided, may be encrypted. As the encryption may occur at the NAS 102, during transit from the NAS 102 to the remote storage 120, 122, 124, or at the remote storage 120, 122, 124, such file parts may require decryption before being functionally-accessible by the requestor. Therefore, one embodiment includes providing the requestor with the necessary decryption key(s) to enable the requestor to decrypt the received file parts. Alternatively, the decryption may occur at the remote storage 120, 122, 124 prior to sending the file part to the remote server 108. Alternatively still, the decryption may occur at the remote server 108. In this case, the appropriate decryption key(s) may be stored, for each of the remote storages 120, 122, 124, in the server database 110. Other alternatives may be readily envisaged and are considered to be part of this disclosure.

According to one embodiment, a determination may be made of the number of times the stored file has been accessed over the computer network. The file in question may then be divided and the constituent parts thereof sent to at least the first and second remote storages (and additional ones as appropriate) when the number of times the stored filed has been accessed over the computer network exceeds an access threshold. For example, a video file that has been shared five times may be a good candidate for treatment according to one embodiment, as continued accesses to this file may well degrade the performance of the NAS 102 and render it less responsive to user access requests and may use an unacceptably large portion of the available bandwidth. As noted above, the method also provides for sending parts of the file to additional remote storages and/or to send several parts of the file to a same remote storage. Moreover, the distribution of the remote storages to which the constituent parts of the file are sent need not be even across remote storages. For example, some remote storages may provide unlimited storage while others may be faster in their response to user's access requests. Such considerations may affect the decisions as to where the file parts are sent. Additionally, redundancy may be built into the system, in that the same file part may be sent to and stored by more than one remote storage device and/or facility. This redundancy enhances the robustness of the present distributed storage system, in that the file may be retrieved from more than one location. One of these locations, according to one embodiment, may be the NAS itself. Indeed, one or more of the constituent parts of the file may be stored in the NAS or in storage that is local to the NAS, while other parts of the file may be stored remotely therefrom. In this manner, a portion of the workload of the NAS may be offloaded to remote storage locations 120, 122, 124. As described above, the selection to which of the plurality of remote storages 120, 122, 124 the first and second parts (and parts of higher ordinality) of the file are to be sent may be based upon characteristics of the file and/or the plurality of remote storages.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. For example, one embodiment is a machine-readable medium having data stored thereon representing sequences of instructions which, when executed by a computing device, causes the computing to carry out NAS offloading of network traffic for shared files, as shown, described and claimed herein. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A device, comprising:
   local storage;
   a network interface configured to couple the device to a computer network; and
   a processor connected to the local storage and to the network interface, the processor being configured to:
   store a file in the local storage;
   divide the file into at least a first part and a second part;
   store the first part and second part of the file in the local storage;
   send the first part of the file to a first selected remote storage coupled to the computer network;
   send the second part of the file to a second selected remote storage coupled to the computer network, the second remote storage being different from the first remote storage;
   receive, over the computer network, a request from a requestor to access the file;
   responsive to the request, send at least one link over the computer network, the at least one link providing the requestor with access, over the computer network, to at least one of the first part and second part of the file in the first and second remote storages;
   determine whether one of the first part and the second part of the file is unavailable or inaccessible from the first remote storage or the second remote storage; and
   responsive to one of the first part and the second part of the file being unavailable or inaccessible from the first remote storage or the second remote storage, send, to the requestor, one of:
   an unavailable or inaccessible one of the first part and second part of the file, from the local storage; and
   a link to the unavailable or inaccessible one of the first part and second part of the file stored in the local storage.

2. The device of claim 1, wherein the processor is further configured to couple, over the computer network, with a server coupled to a database and wherein the database comprises at least one entry that identifies the first selected remote storage and the second selected remote storage.

3. The device of claim 1, wherein the at least one link is sent to the requestor from one of the device and a server coupled to the computer network.

4. The device of claim 1, wherein the at least one link is dynamic and is configured to be dynamically updated.

5. The device of claim 1, wherein at least one of the first remote storage and the second remote storage comprises a file hosting service.

6. The device of claim 1, wherein at least one of the first part of the file and the second part of the file is encrypted.

7. The device of claim 1, wherein the processor is further configured to:
    determine a number of times the stored file has been accessed over the computer network; and
    divide the file and send parts thereof to at least the first and second remote storages when the number of times the stored file has been accessed over the computer network exceeds an access threshold.

8. The device of claim 1, wherein the processor is further configured to also send the second part of the file to at least one of the first remote storage and a third remote storage coupled to the computer network.

9. The device of claim 1, wherein the processor is further configured to select to which of a plurality of remote storages to send the first part and second part of the file based upon at least one of characteristics of the file and the plurality of remote storages.

10. A method of sharing a file, comprising:
    storing a file in a storage device coupled to a computer network;
    dividing the file into at least a first part and a second part;
    storing the first part and the second part of the file in the storage device;
    sending the first part of the file to a first selected remote storage coupled to the computer network;
    sending the second part of the file to a second selected remote storage coupled to the computer network, the second remote storage being different from the first remote storage;
    receiving, over the computer network, a share request from a requestor to access the file;
    responsive to the request, sending at least one link over the computer network, the at least one link providing the requestor with access, over the computer network, to at least one of the first part and second part of the file in the first and second remote storages;
    determining whether one of the first part and the second part of the file is unavailable or inaccessible from the first remote storage or the second remote storage; and
    responsive to one of the first part and the second part of the file being unavailable or inaccessible from the first remote storage or the second remote storage, sending, to the requestor, one of:
        an unavailable or inaccessible one of the first part and second part of the file, from the storage device; and
        a link to the unavailable or inaccessible one of the first part and second part of the file stored in the storage device.

11. The method of claim 10, further comprising updating a database with at least one entry that identifies the first selected remote storage and the second selected remote storage.

12. The method of claim 10, wherein the at least one link is dynamic and wherein the method further comprises dynamically updating the at least one dynamic link.

13. The method of claim 10, wherein at least one of the first remote storage and the second remote storage comprises a file hosting service.

14. The method of claim 10, wherein at least one of the first part of the file and the second part of the file is encrypted.

15. The method of claim 10, further comprising:
    determining a number of times the stored file has been accessed over the computer network; and
    dividing the file and sending parts thereof to at least the first and second remote storages when the number of times the stored file has been accessed over the computer network exceeds an access threshold.

16. The method of claim 10, further comprising sending the second part of the file to at least one of the first remote storage and a third remote storage coupled to the computer network.

17. The method of claim 10, further comprising selecting to which of a plurality of remote storages to send the first part and second part of the file, based upon at least one of characteristics of the file and the plurality of remote storages.

18. A non-transitory machine-readable storage medium having data stored thereon representing sequences of instructions which, when executed by a computing device, causes the computing device to:
    store a file in a storage device coupled to a computer network;
    divide the file into at least a first part and a second part;
    store the first part and the second part of the file in the storage device;
    send the first part of the file to a first selected remote storage coupled to the computer network;
    send the second part of the file to a second selected remote storage coupled to the computer network, the second remote storage being different from the first remote storage;
    receive, over the computer network, a share request from a requestor to access the file;
    responsive to receiving the share request, send at least one link over the computer network, the at least one link providing the requestor with access, over the computer network, to at least one of the first part and second part of the file in the first and second remote storages;
    determine whether one of the first part and the second part of the file is unavailable or inaccessible from the first remote storage or the second remote storage; and
    responsive to one of the first part and the second part of the file being unavailable or inaccessible from the first remote storage or the second remote storage, sending, to the requestor, one of:
        an unavailable or inaccessible one of the first part and second part of the file, from the storage device; and
        a link to the unavailable or inaccessible one of the first part and second part of the file stored in the storage device.

* * * * *